United States Patent
Van Dongen

[15] 3,699,927
[45] Oct. 24, 1972

[54] FEEDER FOR RODENTS

[72] Inventor: Cornelis G. Van Dongen, Watertown, Mass.

[73] Assignee: Bio-Research Consultants Inc., Cambridge, Mass.

[22] Filed: June 4, 1971

[21] Appl. No.: 149,927

[52] U.S. Cl. .................................. 119/61, 119/18
[51] Int. Cl. ........................................... A01k 05/00
[58] Field of Search ......... 119/61, 63, 18, 51; 43/131

[56] References Cited

UNITED STATES PATENTS

| 1,579,512 | 4/1926 | Bushong | 43/131 |
| 3,200,790 | 8/1965 | Anderson | 119/51 R |
| 3,505,977 | 4/1970 | Mancini | 119/61 |

*Primary Examiner*—Hugh R. Chamblee
*Attorney*—Sewall P. Bronstein, John D. Woodberry, Robert T. Gammons, Donald Brown, Robert L. Goldberg and Robert F. O'Connell

[57] ABSTRACT

A cage comprising a container having a floor, a circumscribing side wall and optionally a removable top, the latter, at least, being of perforated construction, and a feeder disposed in the cage. The feeder comprises a member containing one or more chambers having open and closed ends for holding predetermined weights of food and is supported by legs from the floor of the cage with the chambers inclined and with the open ends at the higher level so that a rodent must stand on its hind legs to reach the open ends of the chambers.

8 Claims, 5 Drawing Figures

PATENTED OCT 24 1972    3,699,927

FEEDER FOR RODENTS

BACKGROUND OF THE INVENTION

Feeders for stock animals, poultry, birds, rodents and the like are disclosed in U.S. Pat. Nos. 3,090,354, 3,074,377, 1,741,194 and 1,343,349. The structures in these patents are designed for making food available without waste. This invention has for its purpose an improved feeder designed to make it difficult for the feeding animal to climb imto the feeder to contaminate the food with bedding material, fecal matter or urine and/or scatter the food, in combination with a cage within which the feeder is placed to constrain the animal while feeding to thereby determine the exact source of the food consumed, its weight and its kind.

SUMMARY

As herein illustrated controlled feeding is accomplished by means of a combination cage and feeder. The cage comprises a receptacle having a floor, side walls circumscribing the floor and a removable top, the latter, at least, containing openings. The feeder comprises a block containing one or more chambers having open and closed ends and legs attached thereto for supporting the block above the floor of the cage with the open ends of the chambers at a higher level than the closed ends so as to require that a rodent stand on its hind legs to reach the open ends. The chambers are of a size such as to admit the head of the rodent but to prevent entrance of the body, are of substantially circular cross-section and of substantially uniform diameter from end to end. A guard is disposed across the open ends of the chambers at the lower sides thereof to prevent withdrawal of food therefrom by retraction of the head. The block is preferably comprised of Plexiglas.

The invention will now be described in greater detail with reference to the accompanying drawing wherein.

Figure 1:
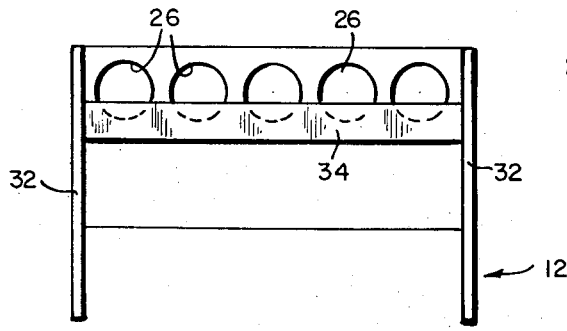
FIG. 1 is a front elevation of the feeder.
Figure 2:
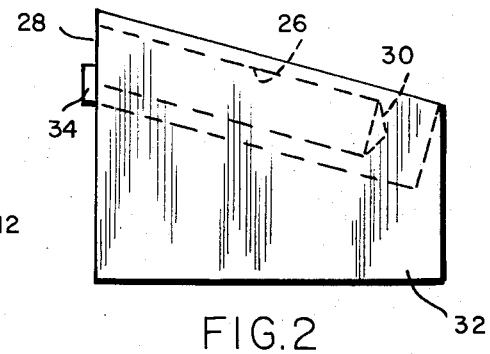
FIG. 2 is a side elevation of the feeder.
Figure 3:
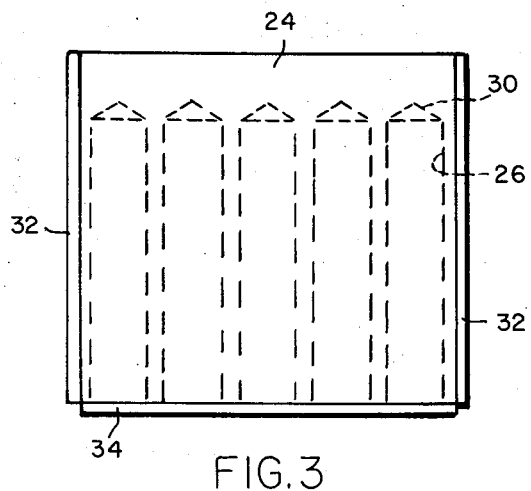
FIG. 3 is a top plan view of the feeder.
Figure 4:
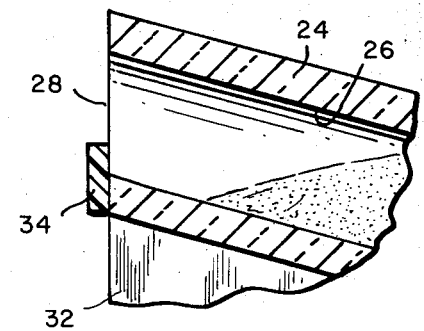
FIG. 4 is an enlarged fragmentary section near the open end of a chamber of the feeder.

As referred to above, the apparatus herein disclosed is for the purpose of confining a rodent and simultaneously feeding it determinable weights of food and to this end comprises a cage 10 (FIG. 5) and a feeder 12 (FIGS. 1, 2 and 3) which is adapted to be placed in the cage and rigidly held therein so that it cannot be displaced by the rodent while feeding.

The cage 10 (FIG. 5), as herein illustrated, comprises a receptacle having a flat floor 14, a peripheral side wall 16 and optionally a cover 18. When the cover is used it may be removably attached by providing the wall 16 with an outturned flange 20 and the cover with an inturned flange 22 which may be engaged with the flange 20. Such a cover 18 may be provided with openings and may be in the form of a wire grid. The bottom and side walls of the receptacle are here shown as a non-perforate structure formed of a rigid material such as Plexiglas and preferably transparent so that the rodent may be observed. Alternatively, the receptacle may be a wire, metal or wooden structure.

The feeder 12 (FIGS. 1 to 3) comprises a rigid block 24 of Plexiglas containing a plurality of elongate bored chambers 26 situated in spaced parallel relation, having open ends 28 and closed ends 30. The block has fastened to its opposite ends spaced parallel legs 32–32, the lower edges of which are adapted to rest on the floor of the cage and to support the block 24 with the open ends of the chambers 26 at a higher level than the closed ends. The cover prevents the rodent from climbing out of the cage.

Figure 5:
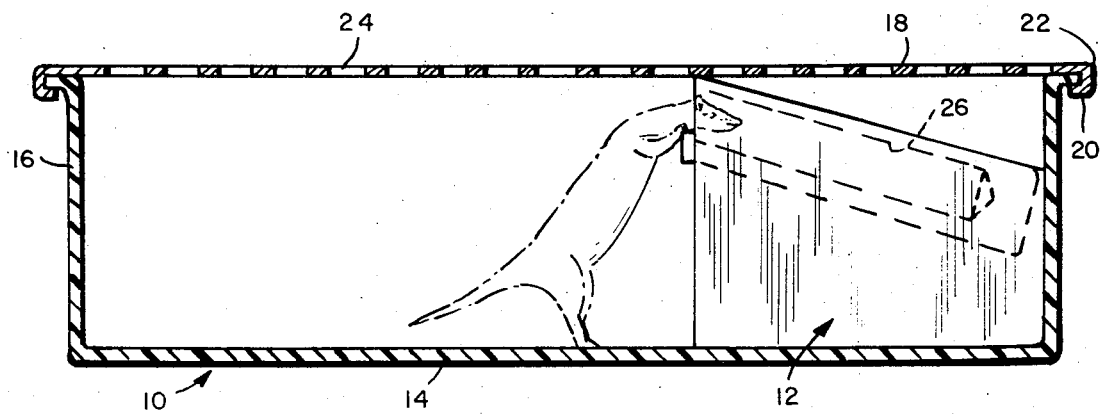
FIG. 5 is a vertical section through a cage containing the feeder showing the approximate position of a feeding rodent.

The chambers 26 are supported at an angle so that the food deposited in the chambers will gravitate toward the closed ends, with the open ends of the chambers at such a level that a rodent must stand on its hind legs to reach it as clearly illustrated in FIG. 5. To prevent a rodent from attempting to climb into the open ends of the chambers the block is supported only at its ends so that there is no support between the floor and the block upon which the rodent can use its hind legs to elevate itself. Additionally, the diameters of the chambers are made small enough so that if a rodent is able to thrust its head and neck into the chamber beyond a predetermined distance it will block the opening, cutting off the access of air thereto so that the rodent is ultimately required to withdraw its head for lack of air rather than to continue with its effort to climb into the chamber thus discouraging and preventing a particularly agile and persistent rodent from climbing into the chamber in spite of the fact of its height from the floor.

A guard bar 34 is disposed against the forward end of the block 24 across the open ends of the chambers at the lower sides thereof to prevent food from being pulled out by a rodent withdrawing its head.

In using the apparatus the feeder is placed within the receptacle afterhaving filled the chambers with predetermined weights of food of the same or different kinds. Following a measured time interval the feeder is removed and the food remaining in the chamber is weighed to determine how much food the rodent consumed during the aforesaid period of time. By providing the several chambers different kinds of food may be placed in the feeder to enable determining the acceptability and preference of one kind of food as compared to another. A very accurate record of the weight and kind of food consumed by the rodent in a predetermined time can thus be recorded.

It should be understood that the present disclosure is for the purpose of illustration only and that this invention includes all modifications and equivalents falling within the scope of the appended claims.

I claim:

1. A feeder for a rodent comprising a block containing an elongate chamber closed at one end and open at the other and means supporting the block at a predetermined level with the chamber inclined and with the open end at the higher level, said open end being of such size as to admit the head of a rodent and at a level such that the rodent must stand on its hind legs to reach said open end.

2. A feeder according to claim 1, wherein said means supporting the block are spaced parallel legs disposed at opposite sides of the block so that there is no intervening support between said legs between the lower ends thereof and the block.

3. A feeder according to claim 1, wherein the open end of the chamber is of such size that the entrance of the head and body contiguous thereto into the open end will prevent access of air to the chamber.

4. A feeder according to claim 1, wherein said block contains a plurality of spaced parallel chambers.

5. A feeder according to claim 1, wherein a guard is disposed across the open end of the chamber at the lower side thereof.

6. A feeder according to claim 1, wherein the chamber is of circular cross-section and of substantially uniform diameter from its open end to its closed end.

7. A feeder according to claim 1, wherein the block is comprised of Plexiglas and is transparent.

8. A feeder for rodents comprising a block of Plexiglas containing an elongate chamber closed at one end and open at the other, a pair of spaced parallel legs between which the block is fixed in an inclined position with the open end of the chamber at the higher level so that food deposited in the chamber will gravitate toward the closed end, and a guard disposed across the open end of the chamber at the lower side such as to close a portion at the lower side, said open end being supported by the legs at a height such that the rodent must stand on its hind legs to reach it and of such size that entrance of the body thereto will block access of air to the chamber.

* * * * *